United States Patent
Böös et al.

(10) Patent No.: US 9,878,281 B2
(45) Date of Patent: Jan. 30, 2018

(54) COMBUSTION SYSTEM AND COMBUSTION METHOD

(71) Applicant: ALSTOM Technology Ltd, Baden (CH)

(72) Inventors: Erik W. Böös, Vederslöv (SE); Stefan Oscar Hugo Åhman, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 523 days.

(21) Appl. No.: 14/568,554

(22) Filed: Dec. 12, 2014

(65) Prior Publication Data
US 2015/0165367 A1 Jun. 18, 2015

(30) Foreign Application Priority Data

Dec. 13, 2013 (EP) .................................. 13197198

(51) Int. Cl.
| | |
|---|---|
| *B01D 53/40* | (2006.01) |
| *B01D 53/50* | (2006.01) |
| *B01D 53/62* | (2006.01) |
| *B01D 53/74* | (2006.01) |
| *B01D 53/75* | (2006.01) |
| *B01D 53/14* | (2006.01) |
| *F23J 15/00* | (2006.01) |
| *F23J 15/02* | (2006.01) |
| *F23J 15/06* | (2006.01) |

(52) U.S. Cl.
CPC ..... *B01D 53/1418* (2013.01); *B01D 53/1456* (2013.01); *B01D 53/1475* (2013.01); *F23J 15/006* (2013.01); *F23J 15/02* (2013.01); *F23J 15/025* (2013.01); *F23J 15/06* (2013.01); *F23J 2215/20* (2013.01); *Y02E 20/363* (2013.01)

(58) Field of Classification Search
CPC ............ B01D 53/1456; B01D 53/1475; B01D 53/1481; B01D 53/40; B01D 53/50; B01D 53/508; B01D 53/62; B01D 53/74; B01D 53/75; B01D 2251/404; B01D 2257/302; B01D 2257/504; B01D 2258/0283

See application file for complete search history.

(56) References Cited

U.S. PATENT DOCUMENTS

| | | | |
|---|---|---|---|
| 9,651,252 B2 * | 5/2017 | Abanades Garcia | .... F23J 15/02 |
| 2002/0037246 A1 | 3/2002 | Beal et al. | |
| 2010/0028233 A1 * | 2/2010 | Dreuscher | ............ B01D 53/501 423/244.08 |
| 2014/0102343 A1 * | 4/2014 | Stallmann | ............... B01D 53/96 110/345 |

FOREIGN PATENT DOCUMENTS

| | | |
|---|---|---|
| EP | 0 550 905 A1 | 7/1993 |
| EP | 2 145 670 A1 | 1/2010 |
| EP | 2 559 475 A1 | 2/2013 |

* cited by examiner

*Primary Examiner* — Timothy C Vanoy
(74) *Attorney, Agent, or Firm* — GE Global Patent Operation; Cynthia W. Flanigan

(57) ABSTRACT

The combustion system includes a boiler and a flue gas treatment system downstream of the boiler. The flue gas treatment system includes a desulphurization unit, a carbonator and a calciner defining a carbonator/calciner loop. The flue gas from the desulphurization unit is fed into the carbonator. No air pre-heaters, for pre-heating combustion oxidizer to be supplied into the boiler using heat of flue gas, are provided at the boiler and between the boiler and the carbonator.

11 Claims, 1 Drawing Sheet

COMBUSTION SYSTEM AND COMBUSTION METHOD

CROSS-REFERENCE TO RELATED APPLICATIONS

This application claims priority to European application 13197198.8 filed Dec. 13, 2013, the contents of which are hereby incorporated in its entirety.

TECHNICAL FIELD

The present disclosure relates to a combustion system and a combustion method. In particular the present disclosure refers to a combustion system and method for a boiler of a power plant.

BACKGROUND

It is known how to provide power plants with a boiler for steam generation and a flue gas treatment system downstream of the boiler. The flue gas treatment systems are used to remove components that can be dangerous for the environment from the flue gas that is discharged into the atmosphere, such as carbon dioxide.

A number of different systems are known to remove carbon dioxide from flue gas, such as the carbonator/calciner loop. According to this system, flue gas is supplied into the carbonator such that the $CO_2$ reacts with a sorbent (for example CaO) to generate $CaCO_3$; this reaction is usually carried out at a temperature between 550-650° C.

The $CaCO_3$ is supplied to the calciner, where at a temperature usually between 850-1050° C. it is decomposed into $CO_2$ that is stored or used in other way and CaO that is recycled back into the carbonator.

EP 2 559 475 discloses a system having the features described above.

In addition to $CO_2$, usually other gaseous components contained in the flue gas must be removed before discharging the flue gas into the atmosphere.

For example, often the fuel contains sulphur that during combustion generate sulphur components that shall be removed from the flue gas before discharging the flue gas into the atmosphere.

US2002/0037246 discloses how to supply CaO in a combustion chamber (for example of a circulating fluidized bed) in order to remove $SO_2$ and, in addition, this document also discloses how to use the surplus CaO in the ash to capture $CO_2$ from the flue gas. US2002/0037246 does not deal with the thermodynamic optimization of a boiler and, in particular, of a boiler provided with a flue gas treatment system.

FIG. 1 shows an example of a boiler 1 with a flue gas treatment system 2. The flue gas treatment system 2 comprises a heat exchanger 3 immediately downstream of the boiler 1. The heat exchanger 3 is an air pre-heater for pre-heating the combustion air that is supplied into the boiler. In different embodiments the heat exchanger 3 can be downstream of the boiler or it can be within the boiler. Downstream of the heat exchanger 3 a desulphurization unit 4, another heat exchanger 5 and a carbonator/calciner loop 6 are provided. The heat exchanger 5 is for heating the flue gas up to a temperature that fits the temperature of the carbonator into which the flue gas is fed. From the carbonator/calciner loop 6 a $CO_2$ stream 7 and a vented gas stream 8 (comprising e.g. $N_2$, Argon) are discharged.

In addition, a dust removal unit 9 is often provided downstream of the boiler 1.

Thermodynamic optimization is achieved by optimizing the boiler; thus the boiler 1 and the heat exchanger 3 (air pre-heater) are optimized in order to increase thermal efficiency.

Nevertheless, even if the thermal efficiency of the boiler is optimized, the global thermal efficiency of the boiler and flue gas treatment system could not be optimized.

In fact after the flue gas is cooled at the heat exchanger 3 (in order to heat the combustion air supplied into the boiler), the flue gas must be sensibly heated again at the heat exchanger 5. This large heating can affect the global thermal efficiency of the boiler and flue gas treatment system.

SUMMARY

An aspect of the disclosure includes providing a system and a method that improve the global thermal efficiency of the boiler and flue gas treatment system.

These and further aspects are attained by providing a system and a method in accordance with the accompanying claims.

BRIEF DESCRIPTION OF THE DRAWINGS

Further characteristics and advantages will be more apparent from the description of a preferred but non-exclusive embodiment of the system and method, illustrated by way of non-limiting example in the accompanying drawings, in which.

DETAILED DESCRIPTION

Figure 1:
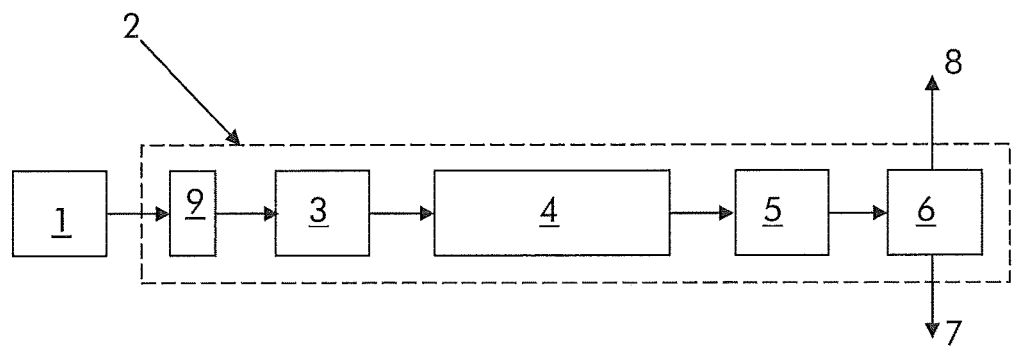
FIG. 1 shows a boiler and a flue gas treatment system according to the prior art.
Figure 2:
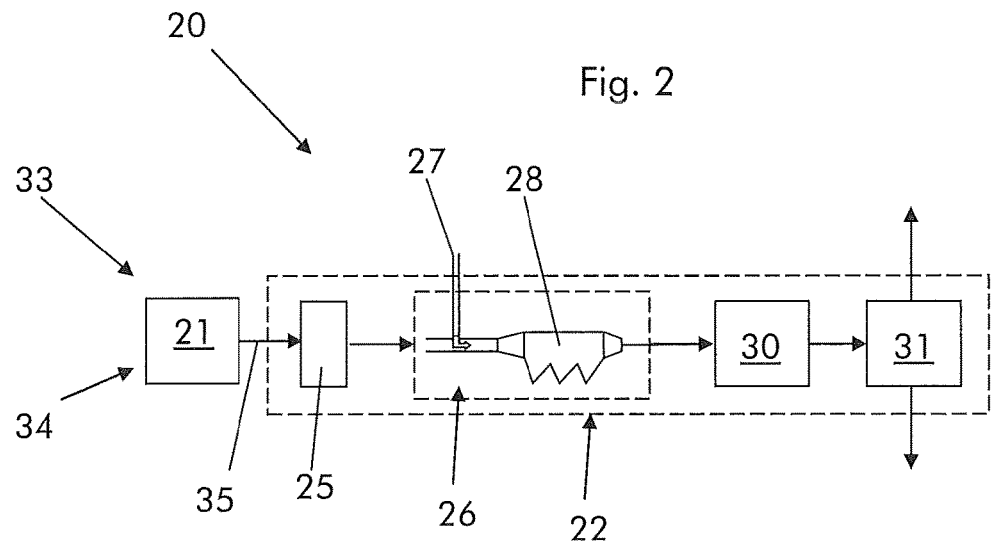
FIG. 2 shows a boiler and a flue gas treatment system in an embodiment of the invention.

With reference to FIG. 2, the combustion system 20 comprises a boiler 21 and a flue gas treatment system 22 connected downstream of the boiler 21 via a flue gas duct 35.

The boiler is used for generating steam, for example for a power plant.

The flue gas treatment system 22 comprises a dust removal unit 25 (but this is not mandatory) and a desulphurization unit 26; preferably, the dust removal unit is provided upstream of the desulphurization unit 26.

The desulphurization unit 26 preferably includes at least a sorbent injector 27 and at least a filter 28, e.g. a fabric filter.

The sorbent injector 27 supplies a sorbent such as $Ca(OH)_2$ into the flue gas; the sorbent reacts with gaseous sulphur components contained in the flue gas to form solid sulphur components that are captured in the filter 28.

Downstream of the desulphurization unit 26 a heat exchanger 30 is provided; the heat exchanger 30 is provided between the desulphurization unit 26 and the carbonator of the carbonator/calciner loop 31, to heat the flue gas supplied into the carbonator. According to the particular design conditions, the heat exchanger 30 could be excluded, i.e. the heat exchanger 30 is optional and it is used only if needed.

Downstream of the desulphurization unit 26 and heat exchanger 30 the carbonator calciner loop 31 is provided. In particular, as known, the flue gas is supplied into the carbonator.

In contrast to what is shown in the prior art, no air pre-heaters are provided using heat from the flue gas for pre-heating of the combustion air to be supplied into the boiler 21, neither at the boiler 21 nor between the boiler 21 and the carbonator of the carbonator/calciner loop 31.

The operation of the combustion system 20 is apparent from what is described and illustrated and is substantially the following.

The boiler 21 is supplied with fuel 33 and oxidizer 34 such as air for burning the fuel to generate heat, which is used to generate steam (that is for example directed to a steam turbine), and flue gas.

The flue gas is discharged from the boiler 21 at a relatively high temperature, for example higher than 350° C. and preferably 380° C. as the flue gas is no longer used to heat the combustion air supplied to the boiler 21. The flue gas maintains the high temperature in the duct 35.

The flue gas is thus directed through the optional dust removal unit 25 where dust is removed and then flue gas is directed to the desulphurization unit 26 where a sorbent such as $Ca(OH)_2$ is injected into the flue gas to remove sulphur components and possibly other acidic components such as HCl.

For example the reactions are:

$$Ca(OH)_2 + SO_2 \longleftrightarrow CaSO_3 + H_2O$$

$$Ca(OH)_2 + SO_2 + \tfrac{1}{2}O_2 \longleftrightarrow CaSO_4 + H_2O$$

$$Ca(OH)_2 + 2HCl \longleftrightarrow CaCl_2 + 2H_2O$$

The flue gas discharged from the desulphurization unit 26 has still a relatively high temperature, because only a low temperature decrease occurs when passing through the dust removal unit 25 and the desulphurization unit 26.

The flue gas is then supplied into the carbonator. The carbonator has an operating temperature of about 550-650° C. and therefore the flue gas might be passed through the heat exchanger 30 where it is heated before being supplied into the carbonator; The required heating at the heat exchanger 30 is now however less than in the prior art.

According to the particular design, the heat exchanger 30 could also be avoided, if the temperature of the flue gas from the desulphurization unit 26 fits with the required temperature at the carbonator (i.e. is the same as or is close enough to the temperature at the carbonator).

The flue gas is finally supplied into the carbonator of the carbonator/calciner loop 31.

The present disclosure also refers to a method for operating a combustion system comprising a boiler 21 and a flue gas treatment system 22 downstream of the boiler 21.

The method comprises
combusting a fuel with an oxidiser such as air generating flue gas,
removing sulphur and possibly other acidic components from the flue gas,
supplying the flue gas deprived of the sulphur components into a carbonator of a carbonator/calciner loop 31.

Advantageously, the oxidizer to be supplied into the boiler, is not pre-heated using heat from the flue, gas, at the boiler 21 and between the boiler 21 and the carbonator.

In addition and preferably, the flue gas to be supplied into the desulphurisation unit is not cooled before entering the carbonator.

Preferably removing sulphur and possibly other acidic components comprises injecting a sorbent into the flue gas, for the sorbent to react with gaseous sulphur and acidic components contained in the flue gas to form solid sulphur and chloride components, and then removing these components for example by passing the flue gas through at least a filter.

In addition, after removing sulphur and possibly other acidic components from the flue gas and before supplying the flue gas into the carbonator, the flue gas is preferably heated. In preferred embodiments, the flue gas discharged from the boiler 21 has a temperature above 350° C. and preferably above 380° C.

Naturally the features described may be independently provided from one another.

In practice the materials used and the dimensions can be chosen at will according to requirements and to the state of the art.

The invention claimed is:

1. A combustion system comprising a boiler and a flue gas treatment system downstream of the boiler, the flue gas treatment system comprising:
   a desulphurization unit; and
   a carbonator and a calciner defining a carbonator/calciner loop, the flue gas from the desulphurization unit being fed into the carbonator;
   wherein no air pre-heaters, for pre-heating combustion oxidizer to be supplied into the boiler using heat of flue gas, are provided at the boiler and between the boiler and the carbonator;
   wherein the flue gas discharged from the boiler has a temperature above 350° C.; and
   wherein the gas treatment system includes a dust removal unit upstream of the desulphurization unit.

2. The combustion system of claim 1, wherein the desulphurization unit includes at least a sorbent injector and at least a filter, the at least a sorbent injector for supplying sorbent into the flue gas for reaction with at least gaseous sulphur components contained in the flue gas to form at least solid sulphur components, and the least a filter for catching the at least solid sulphur components.

3. The combustion system of claim 1, further comprising a heat exchanger is provided between the desulphurization unit and the carbonator, to heat the flue gas supplied into the carbonator.

4. A method for operating a combustion system having a boiler and a flue gas treatment system downstream of the boiler, the method comprising:
   combusting a fuel with an oxidizer generating flue gas;
   removing sulphur components from the flue gas; and
   supplying the flue gas deprived of the sulphur components into a carbonator of a carbonator/calciner loop,
   wherein no pre-heating of the oxidizer to be supplied into the boiler, using heat of the flue gas, at the boiler and between the boiler and the carbonator is carried out,
   wherein the flue gas discharged from the boiler has a temperature above 350° C.; and
   further comprising removing dust from the flue gas before removing the sulphur components.

5. The method of claim 4, wherein removing sulphur components comprises:
   injecting a sorbent into the flue gas, for the sorbent to react with gaseous sulphur components contained in the flue gas to form at least solid sulphur components; and
   catching the solid sulphur components.

6. The method of claim 5, wherein the solid sulphur components are removed by passing the flue gas through at least a filter.

7. The method of claim 4, wherein the flue gas is heated after removing sulphur components therefrom and before supplying the flue gas into the carbonator.

8. The method of claim 4, wherein the flue gas discharged from the boiler has a temperature above 380° C.

9. The method of claim 4, wherein the temperature of the flue gas into which the sorbent is injected and that is passed through at least a filter is above 350° C.

10. The method of claim 9, wherein the temperature of the flue gas into which the sorbent is injected and that is passed through at least a filter is above 380° C.

11. The method of claim 4, further comprising removing acidic components from the flue gas together with the sulphur components.

* * * * *